United States Patent
Chen (10) Patent No.: US 10,142,249 B2
(45) Date of Patent: Nov. 27, 2018

(54) METHOD AND APPARATUS FOR DETERMINING BUFFER STATUS OF USER EQUIPMENT

(71) Applicant: Huawei Technologies Co., Ltd., Shenzhen (CN)

(72) Inventor: Bing Chen, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 151 days.

(21) Appl. No.: 15/175,827

(22) Filed: Jun. 7, 2016

(65) Prior Publication Data

US 2016/0294716 A1    Oct. 6, 2016

Related U.S. Application Data (63) Continuation of application No. PCT/CN2014/083687, filed on Aug. 5, 2014.

(30) Foreign Application Priority Data

Dec. 9, 2013  (CN) .......................... 2013 1 0664193

(51) Int. Cl.
   *G06F 15/173*   (2006.01)
   *G06F 15/16*    (2006.01)
   (Continued)

(52) U.S. Cl.
   CPC ............ *H04L 47/34* (2013.01); *H04L 47/193* (2013.01); *H04L 65/607* (2013.01);
   (Continued)

(58) Field of Classification Search
   CPC ...................................................... H04L 47/34
   See application file for complete search history.

(56) References Cited

U.S. PATENT DOCUMENTS 5,677,969 A      10/1997   Auyeung et al.
6,142,913 A  *   11/2000   Ewert ................... A63B 24/00
                                             386/E5.002

(Continued)

FOREIGN PATENT DOCUMENTS

CN         101005606 A      7/2007
CN         101378356 A      3/2009
(Continued)

OTHER PUBLICATIONS

"Series G: Transmission Systems and Media, Digital Systems and Networks, Quality of service and performance—Generic and user-related aspects, Performance parameter definitions for quality of speech and other voiceband applications utilizing IP networks," ITU-T, G.1020, Nov. 2003, 30 pages.

(Continued)

*Primary Examiner* — Gerald A Smarth
(74) *Attorney, Agent, or Firm* — Conley Rose, P.C.

(57) ABSTRACT

A method and an apparatus for determining a buffer status of user equipment (UE), where the method includes acquiring media information of each transmission control protocol (TCP) packet sent to UE, receiving an acknowledgment packet sent by the UE, and determining, according to the acknowledgment packet and the media information of each TCP data packet, a media period of time during which data received by the UE can be continuously played.

20 Claims, 2 Drawing Sheets

(51) Int. Cl.
*H04L 12/801* (2013.01)
*H04L 29/06* (2006.01)
(52) U.S. Cl.
CPC .......... *H04L 65/608* (2013.01); *H04L 69/163* (2013.01); *H04L 69/28* (2013.01)

(56) References Cited

U.S. PATENT DOCUMENTS

| | | | |
|---|---|---|---|
| 6,757,796 B1* | 6/2004 | Hofmann | H04L 12/1827 |
| | | | 348/E5.008 |
| 7,380,028 B2 | 5/2008 | Crinon et al. | |
| 7,388,912 B1 | 6/2008 | Katsavounidis et al. | |
| 7,574,726 B2 | 8/2009 | Zhang et al. | |
| 7,933,328 B2 | 4/2011 | DeGarrido et al. | |
| 9,237,387 B2* | 1/2016 | Bocharov | H04N 21/4331 |
| 9,769,231 B1* | 9/2017 | Cotter | H04L 65/60 |
| 2007/0292135 A1* | 12/2007 | Guo | H04B 10/1143 |
| | | | 398/106 |
| 2009/0043908 A1* | 2/2009 | Masunaga | G11B 27/105 |
| | | | 709/231 |
| 2009/0080512 A1 | 3/2009 | Veerepalli et al. | |
| 2009/0164656 A1 | 6/2009 | Guan | |
| 2012/0110167 A1 | 5/2012 | Joch et al. | |
| 2012/0327779 A1* | 12/2012 | Gell | H04L 47/2475 |
| | | | 370/238 |
| 2013/0272121 A1* | 10/2013 | Stanwood | H04L 47/2475 |
| | | | 370/230 |
| 2014/0237112 A1 | 8/2014 | Chen | |
| 2014/0298366 A1 | 10/2014 | Chen et al. | |
| 2015/0271242 A1 | 9/2015 | Jiang et al. | |

FOREIGN PATENT DOCUMENTS

| | | |
|---|---|---|
| CN | 101656747 A | 2/2010 |
| CN | 103001961 A | 3/2013 |
| CN | 103095517 A | 5/2013 |
| CN | 103188236 A | 7/2013 |

OTHER PUBLICATIONS

"Improvement of network-based QoE estimation for TCP based streaming services," Telecommunication Standardization Sector, COM 12-C 53-E, Feb. 2013, 3 pages.
Foreign Communication From a Counterpart Application, PCT Application No. PCT/CN2014/083687, English Translation of International Search Report dated Oct. 31, 2014, 2 pages.
Foreign Communication From a Counterpart Application, PCT Application No. PCT/CN2014/083687, English Translation of Written Opinion dated Oct. 31, 2014, 5 pages.
Machine Translation and Abstract of Chinese Publication No. CN101378356, Mar. 4, 2009, 7 pages.
Machine Translation and Abstract of Chinese Publication No. CN101656747, Feb. 24, 2010, 7 pages.
Foreign Communication From a Counterpart Application, Chinese Application No. 201310664193.6, Chinese Search Report dated Jun. 19, 2017, 2 pages.
Foreign Communication From a Counterpart Application, Chinese Application No. 201310664193.6, Chinese Office Action dated Jun. 28, 2017, 5 pages.

* cited by examiner

METHOD AND APPARATUS FOR DETERMINING BUFFER STATUS OF USER EQUIPMENT

CROSS-REFERENCE TO RELATED APPLICATIONS

This application is a continuation of International Application No. PCT/CN2014/083687, filed on Aug. 5, 2014, which claims priority to Chinese Patent Application No. 201310664193.6, filed on Dec. 9, 2013, both of which are hereby incorporated by reference in their entireties.

TECHNICAL FIELD

Embodiments of the present disclosure relate to the communications field, and in particular, to a method and an apparatus for determining a buffer status of user equipment.

BACKGROUND

To smooth impact brought by network transmission and synchronize play at a transmit end with that at a receive end, an audio/video application on a current Internet Protocol (IP) network uses a buffer at the receive end in order to smooth impact of network jitter on the application. Furthermore, the receive end needs to temporarily store received data in the buffer, and provides a user with audio/video data according to a decoding demand. Such a buffer is referred to as a de-jitter buffer, which ensures that audio/video can be continuously played after being transmitted on the network. Design of the de-jitter buffer needs to comprehensively consider a delay and a packet loss that are brought by buffering. An undersized buffer may cause excessive packet losses, and an oversized buffer may cause a long play delay.

Voice over Internet Protocol (VoIP), which is a real-time voice communications technology based on an IP network, has been widely used in recent years. The VoIP has advantages such as a low call cost, a small occupied bandwidth, and provision of various multimedia services, and is a research focus in the current computer network and communications fields. Factors that affect voice quality of the VoIP mainly include a delay, a packet loss, and jitter, and the jitter is mainly processed using the de-jitter buffer at the receive end. The de-jitter buffer can effectively absorb network jitter, and reduce a packet loss rate. Performance of the de-jitter buffer directly affects the voice quality of the VoIP. If an excessively large size is set for a de-jitter buffer, a voice delay increases accordingly. If an excessively small size is set for a de-jitter buffer, delay jitter cannot be absorbed, which causes an increase in a voice packet loss rate. Therefore, setting of the de-jitter buffer needs to balance the delay and the packet loss rate.

An existing de-jitter buffer modeling algorithm is dedicated for a real-time transport protocol (RTP) or user datagram protocol (UDP) scenario in which a delay of each received RTP packet is calculated using arrival time, a time stamp, and a sequence number of the RTP packet, and it is further determined whether the packet belongs to a network-lost packet, an actively discarded packet, or a normal packet. However, the de-jitter buffer modeling algorithm does not consider a transmission control protocol (TCP) scenario, such as progressive download (PD) or dynamic adaptive streaming over hypertext transfer protocol (HTTP) (DASH). Because data transmission in the TCP scenario has a feature completely different from that in the UDP scenario, the existing de-jitter buffer modeling algorithm dedicated for UDP cannot be used to determine a buffer status of user equipment (UE) in the TCP scenario. Therefore, how to determine the buffer status of the UE in the TCP scenario, and in particular, how to determine a media period of time during which data received by the UE can be continuously played is an urgent technical problem to be resolved.

SUMMARY

The present disclosure provides a method and an apparatus for determining a buffer status of UE, which can determine, in a TCP scenario, a media period of time during which data received by the UE can be continuously played.

According to a first aspect, a method for determining a buffer status of UE is provided, including acquiring media information of each TCP packet sent to the UE, receiving an acknowledgment packet sent by the UE, and determining, according to the acknowledgment packet and the media information of each TCP packet, a media period of time during which data received by the UE can be continuously played.

With reference to the first aspect, in a first possible implementation manner, determining, according to the acknowledgment packet and the media information of each TCP packet, a media period of time during which data received by the UE can be continuously played includes determining, according to the acknowledgment packet, a sequence number of a TCP packet received by the UE, and determining, according to the sequence number of the TCP packet received by the UE and the media information of each TCP packet, the media period of time during which the data received by the UE can be continuously played.

With reference to the first possible implementation manner of the first aspect, in a second possible implementation manner, the media information includes a decoding time stamp (DTS), and determining, according to the sequence number of the TCP packet received by the UE and the media information of each TCP packet, the media period of time during which the data received by the UE can be continuously played includes determining, according to the media information of each TCP packet, a correspondence between a sequence number and a DTS of the TCP packet, and determining, according to the correspondence between the sequence number and the DTS of the TCP packet and the sequence number of the TCP packet received by the UE, the media period of time during which the data received by the UE can be continuously played.

With reference to the first possible implementation manner of the first aspect, in a third possible implementation manner, determining, according to the sequence number of the TCP packet received by the UE and the media information of each TCP packet, the media period of time during which the data received by the UE can be continuously played includes determining, according to the media information of each TCP packet, a correspondence between a sequence number and a media play period of time of the TCP packet, and determining, according to the correspondence between the sequence number and the media play period of time of the TCP packet and the sequence number of the TCP packet received by the UE, the media period of time during which the data received by the UE can be continuously played.

With reference to the first possible implementation manner of the first aspect, in a fourth possible implementation manner, determining, according to the sequence number of the TCP packet received by the UE and the media information of each TCP packet, the media period of time during which the data received by the UE can be continuously played includes determining, according to the media information of each TCP packet, a correspondence between a byte quantity and a media play period of time of the TCP packet, determining, according to the sequence number of the TCP packet received by the UE, a byte quantity of the TCP packet received by the UE, and determining, according to the correspondence between the byte quantity and the media play period of time of the TCP packet and the byte quantity of the TCP packet received by the UE, media information of the TCP packet received by the UE.

With reference to the first aspect or any one of the first, the third, and the fourth possible implementation manners of the first aspect, in a fifth possible implementation manner, the media information includes a DTS.

With reference to the first aspect or any one of the first to the fifth possible implementation manners of the first aspect, in a sixth possible implementation manner, the media information includes at least one media type information, frame byte quantity information, and frame integrity information.

According to a second aspect, an apparatus for determining a buffer status of UE is provided, including an acquiring module configured to acquire media information of each TCP packet sent to the UE, a receiving module configured to receive an acknowledgment packet sent by the UE, and a determining module configured to determine, according to the acknowledgment packet received by the receiving module and the media information that is of each TCP packet and is acquired by the acquiring module, a media period of time during which data received by the UE can be continuously played.

With reference to the second aspect, in a first possible implementation manner, the determining module includes a first determining unit configured to determine, according to the acknowledgment packet, a sequence number of a TCP packet received by the UE, and the second determining unit configured to determine, according to the sequence number that is of the TCP packet received by the UE and is determined by the first determining unit and the media information that is of each TCP packet and is acquired by the acquiring module, the media period of time during which the data received by the UE can be continuously played.

With reference to the first possible implementation manner of the second aspect, in a second possible implementation manner, the media information includes a DTS, and the second determining unit includes a first determining subunit configured to determine, according to the media information that is of each TCP packet and is acquired by the acquiring module, a correspondence between a sequence number and a DTS of the TCP packet, and a second determining subunit configured to determine, according to the correspondence between the sequence number and the DTS of the TCP packet and is determined by the first determining subunit and the sequence number that is of the TCP packet received by the UE and is determined by the first determining unit, the media period of time during which the data received by the UE can be continuously played.

With reference to the first possible implementation manner of the second aspect, in a third possible implementation manner, the second determining unit includes a third determining subunit configured to determine, according to the media information that is of each TCP packet and is acquired by the acquiring module, a correspondence between a sequence number and a media play period of time of the TCP packet, and a fourth determining subunit configured to determine, according to the correspondence between the sequence number and the media play period of time of the TCP packet and is determined by the third determining subunit and the sequence number that is of the TCP packet received by the UE and is determined by the first determining unit, the media period of time during which the data received by the UE can be continuously played.

With reference to the first possible implementation manner of the second aspect, in a fourth possible implementation manner, the second determining unit includes a fifth determining subunit configured to determine, according to the media information that is of each TCP packet and is acquired by the acquiring module, a correspondence between a byte quantity and a media play period of time that are of a TCP packet, a sixth determining subunit configured to determine, according to the sequence number that is of the TCP packet received by the UE and is determined by the first determining unit, a byte quantity of the TCP packet received by the UE, and a seventh determining subunit configured to determine, according to the correspondence between the byte quantity and the media play period of time of the TCP packet and is determined by the fifth determining subunit and the byte quantity that is of the TCP packet received by the UE and is determined by the sixth determining subunit, media information of the TCP packet received by the UE.

With reference to the second aspect or any one of the first, the third, and the fourth possible implementation manners of the second aspect, in a fifth possible implementation manner, the media information includes a DTS.

With reference to the second aspect or any one of the first to the fifth possible implementation manners of the second aspect, in a sixth possible implementation manner, the media information includes at least one type of the following information: media type information, frame byte quantity information, and frame integrity information.

Based on the foregoing technical solutions, according to the method and the apparatus for determining a buffer status of UE in the embodiments of the present disclosure, media information of each TCP packet sent to the UE is determined, a TCP packet received by the UE is determined according to an acknowledgment packet sent by the UE, and a media period of time during which data received by the UE can be continuously played can be determined, and then a buffer status of the UE can be determined, which improves user experience and enhances system performance.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some, but not all of the embodiments of the present disclosure. All other embodiments obtained by a person of ordinary skill in the art based on the embodiments of the present disclosure without creative efforts shall fall within the protection scope of the present disclosure.

It should be understood that the technical solutions of the embodiments of the present disclosure may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WIMAX) communications system, or the like.

It should also be understood that in the embodiments of the present disclosure, UE may be referred to as a terminal, a mobile station (MS), a mobile terminal, and the like. The UE may communicate with one or more core networks using a radio access network (RAN). For example, the UE may be a mobile phone (also referred to as a "cellular" phone) or a computer with a mobile terminal. For example, the UE may also be a portable, pocket-sized, handheld, computer built-in, or an in-vehicle mobile apparatus, which exchanges voice and/or data with the radio access network.

Figure 1:
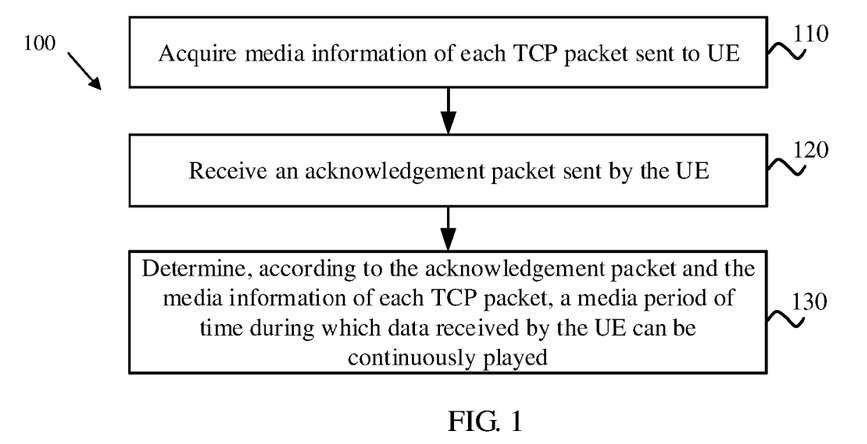
FIG. 1 is a schematic flowchart of a method for determining a buffer status of UE according to an embodiment of the present disclosure.

FIG. 1 shows a schematic flowchart of a method 100 for determining a buffer status of UE according to an embodiment of the present disclosure, and the method 100 may be executed by any appropriate apparatus. For ease of description, the following is described using an example in which the method 100 is executed by an application layer device, which, however, is not limited in this embodiment of the present disclosure. As shown in FIG. 1, the method 100 includes the following steps.

Step 110: Acquire media information of each TCP packet sent to UE.

The application layer device may acquire and store the media information of each TCP packet in all TCP packets sent to the UE, and may further acquire and store sequence number information of each TCP packet, which, however, is not limited in this embodiment of the present disclosure. Optionally, if the application layer device acquires the media information and a sequence number of each TCP packet sent to the UE, the application layer device may further establish a correspondence between the sequence number of the TCP packet and the media information of the TCP packet in order to determine, in a subsequent process, media information that is of a TCP packet and corresponds to a sequence number, which is not limited in this embodiment of the present disclosure.

Optionally, the media information may include DTS information, and may further include at least one media type information, frame byte quantity information, and frame integrity information. The media type information is used to indicate a media type of data included in a TCP packet, such as a video or audio. The frame byte quantity information is used to indicate a size of a media data frame carried in a TCP packet. The frame integrity information is used to indicate whether a frame carried in a TCP packet is an integrated frame. Optionally, the media information may further include other information, which is not limited in this embodiment of the present disclosure.

Step 120: Receive an acknowledgment packet sent by the UE.

The acknowledgment packet is used to indicate a TCP packet received by the UE. Accordingly, the application layer device may determine, according to the acknowledgment packet sent by the UE, the TCP packet received by the UE, where the TCP packet received by the UE may be one or more TCP packets of all the packets sent to the UE, which, however, is not limited in this embodiment of the present disclosure.

Step 130: Determine, according to the acknowledgment packet and the media information of each TCP packet, a media period of time during which data received by the UE can be continuously played.

Therefore, according to the method for determining a buffer status of UE in this embodiment of the present disclosure, media information of each TCP packet sent to the UE is determined, a TCP packet received by the UE is determined according to an acknowledgment packet sent by the UE, and a media period of time during which data received by the UE can be continuously played can be determined, and then a buffer status of the UE can be determined, which improves user experience and enhances system performance.

Optionally, in step 130, the application layer device may further determine, by performing the following steps, a media period of time during which data included in the TCP packet received by the UE can be continuously played.

Step A: Determine, according to the acknowledgment packet and the media information of each TCP packet, media information of the TCP packet received by the UE.

Step B: Determine, according to the media information of the TCP packet received by the UE, the media period of time during which the data received by the UE can be continuously played.

Furthermore, in step A, the application layer device may first determine, according to the acknowledgment packet, relevant information about the TCP packet received by the UE, such as sequence number information of the TCP packet received by the UE, and then acquire, according to the relevant information about the TCP packet received by the UE and from the media information of each TCP packet, the media information of the TCP packet received by the UE, where the media information of the TCP packet received by the UE may include DTS information, and may further include other information, which is not limited in this embodiment of the present disclosure. In step B, the application layer device may determine, according to the media information of the TCP packet received by the UE, such as the DTS information, the media period of time during which the data received by the UE can be continuously played, which is not limited in this embodiment of the present disclosure.

Optionally, step A may include determining, according to the acknowledgment packet, a sequence number of the TCP packet received by the UE, and determining, according to the sequence number of the TCP packet received by the UE and the media information of each TCP packet, the media information of the TCP packet received by the UE. Optionally, in another embodiment, the media information of each TCP packet includes frame byte quantity information. Accordingly, determining, according to the sequence number of the TCP packet received by the UE and the media information of each TCP packet, the media information of the TCP packet received by the UE includes determining, according to the sequence number of the TCP packet received by the UE, a byte quantity of the TCP packet received by the UE, and determining, according to the byte quantity of the TCP packet received by the UE and byte quantity information, of a frame, of each TCP packet, the media information of the TCP packet received by the UE, which, however, is not limited in this embodiment of the present disclosure.

Figure 2:
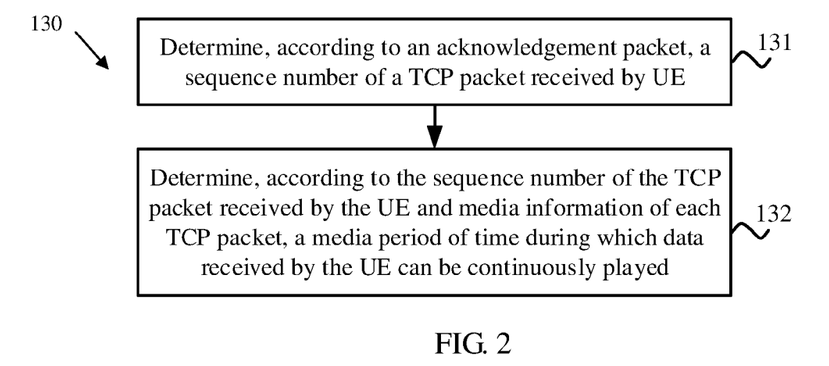
FIG. 2 is a schematic flowchart of another method for determining a buffer status of UE according to an embodiment of the present disclosure.

Optionally, in another embodiment shown in FIG. 2, in step 130, the application layer device may also determine, by performing the following steps, a media period of time during which data included in the TCP packet received by the UE can be continuously played.

Step 131: Determine, according to the acknowledgment packet, a sequence number of the TCP packet received by the UE.

Step 132: Determine, according to the sequence number of the TCP packet received by the UE and the media information of each TCP packet, the media period of time during which the data received by the UE can be continuously played.

In step 132, the application layer device may determine, according to DTS information of each TCP packet and the sequence number of the TCP packet received by the UE, the media period of time during which the data received by the UE can be continuously played, or may determine, according to the media information of each TCP packet, a correspondence between a sequence number and the media information of the TCP packet, and determine, according to the correspondence between the sequence number and the media information of the TCP packet and the sequence number of the TCP packet received by the UE, the media period of time during which the data received by the UE can be continuously played. However, this embodiment of the present disclosure is not limited thereto.

Optionally, determining, according to the sequence number of the TCP packet received by the UE and the media information of each TCP packet, the media period of time during which the data received by the UE can be continuously played in step 132 includes the following steps.

Step 1321: Determine, according to the media information of each TCP packet, a correspondence between a sequence number and a DTS of the TCP packet.

Step 1322: Determine, according to the correspondence between the sequence number and the DTS of the TCP packet and the sequence number of the TCP packet received by the UE, the media period of time during which the data received by the UE can be continuously played.

The media information of each TCP packet may include only the DTS information. Accordingly, the application layer device may acquire only the sequence number and the DTS information of each TCP packet, and establishes the correspondence between the sequence number and the DTS of the TCP packet. For example, as shown in Table 1, the application layer device establishes a correspondence between a sequence number of a TCP packet and a DTS of a frame carried in the TCP packet. The application layer device sends, to the UE, four TCP packets whose sequence numbers are $N_1$, $N_2$, $N_3$, and $N_4$. Three frames are carried in each of the TCP packets whose sequence numbers are $N_1$ and $N_3$, and one frame is carried in each of the TCP packets whose sequence numbers are $N_2$ and $N_4$. It is assumed that the UE receives the TCP packets whose sequence numbers are $N_1$ and $N_2$, and then the UE may determine, according to Table 1, that a media period of time during which the received TCP packets can be continuously played is ($D_5 - D_1$). However, this embodiment of the present disclosure is not limited thereto.

TABLE 1

Example of a correspondence between a sequence number and DTS information of a TCP packet

| Sequence number of a TCP packet | | | | | | | |
|---|---|---|---|---|---|---|---|
| $N_1$ | $N_1$ | $N_1$ | $N_2$ | $N_3$ | $N_3$ | $N_3$ | $N_4$ |
| DTS $D_1$ | $D_2$ | $D_3$ | $D_4$ | $D_5$ | $D_6$ | $D_7$ | $D_8$ |

Optionally, in another embodiment, the application layer device may also determine a media play period of time of each TCP packet according to a DTS of each TCP packet, that is, a media period of time during which data included in each TCP packet can be continuously played. Accordingly, the application layer device may also establish a correspondence between the sequence number and the media play period of time of the TCP packet, and determine, according to the correspondence and the sequence number of the TCP packet received by the UE, the media period of time during which the data received by the UE can be continuously played. Accordingly, determining, according to the sequence number of the TCP packet received by the UE and the media information of each TCP packet, the media period of time during which the data received by the UE can be continuously played in step 132 includes the following steps.

Step 1323: Determine, according to the media information of each TCP packet, a correspondence between a sequence number and a media play period of time of the TCP packet.

Step 1324: Determine, according to the correspondence between the sequence number and the media play period of time of the TCP packet and the sequence number of the TCP packet received by the UE, the media period of time during which the data received by the UE can be continuously played.

A media play period of time of a TCP packet may be determined according to DTS information of a next TCP packet of the TCP packet and DTS information of the TCP packet. That is, a media play period of time of a TCP packet is a difference between a DTS of the first frame carried in a next TCP packet of the TCP packet and a DTS of the first frame carried in the TCP packet. Table 2 shows a correspondence, between a sequence number and a media play period of time of a TCP packet, corresponding to that in Table 1. It is assumed that the UE receives the TCP packets whose sequence numbers are $N_2$ and $N_3$, and then the UE may determine that a media period of time during which the TCP packets received by the UE can be continuously played is ($T_2 + T_3$). However, this embodiment of the present disclosure is not limited thereto.

TABLE 2

Correspondence, between a sequence number and a media play period of time of a TCP packet, corresponding to that in Table 1

| Sequence number of a TCP packet | Media play period of time |
|---|---|
| $N_1$ | $T_1 = D_4 - D_1$ |
| $N_2$ | $T_2 = D_5 - D_4$ |
| $N_3$ | $T_3 = D_8 - D_5$ |

Optionally, in another embodiment, the media information of each TCP packet may also include DTS information, media type information, and frame integrity information. Accordingly, the application layer device may establish a correspondence shown in Table 3. When determining the media period of time during which the TCP data received by the UE can be continuously played, the application layer device may consider only an integrated video frame, and does not consider an audio frame and a non-integrated frame. In this way, the media period of time during which the data included in the TCP packet received by the UE can be continuously played and that is determined by the application layer device has higher precision, which can further improve user experience and enhance system performance. All TCP packets shown in Table 3 carry two audio frames while other frames are video frames. Because video frames included in all TCP packets are independent of audio frames included in all the TCP packets in terms of time, and the video frames and the audio frames are consecutive in terms of time, for ease of description, P and D herein are used to respectively represent a DTS of an audio frame and a DTS of a video frame. It is assumed that the UE receives TCP packets whose sequence numbers are $N_2$ and $N_3$, and a TCP packet whose sequence number is $N_3$ includes an audio frame whose DTS is $P_2$ and a non-integrated video frame whose DTS is $D_5$. The application layer device may exclude these two frames, and determine that a media period of time during which the TCP packets received by the UE can be continuously played is $(D_5-D_3)$. However, this embodiment of the present disclosure is not limited thereto.

TABLE 3

Example of a correspondence between a sequence number and media information of a TCP packet

| Sequence number of a TCP packet | Media Information | | |
| --- | --- | --- | --- |
| | DTS | Media type | Frame integrity |
| $N_1$ | $D_1$ | Video | Yes |
| $N_1$ | $P_1$ | Audio | Yes |
| $N_1$ | $D_2$ | Video | Yes |
| $N_2$ | $D_3$ | Video | Yes |
| $N_3$ | $D_4$ | Video | Yes |
| $N_3$ | $P_2$ | Audio | Yes |
| $N_3$ | $D_5$ | Video | No |
| $N_4$ | $D_6$ | Video | Yes |

Optionally, in another embodiment, the application layer device may further determine, according to the sequence number of the TCP packet received by the UE, a byte quantity of the TCP packet received by the UE, and determine, according to the byte quantity of the TCP packet received by the UE and the media information of each TCP packet, media information of the TCP packet received by the UE. Accordingly, determining, according to the sequence number of the TCP packet received by the UE and the media information of each TCP packet, the media period of time during which the data received by the UE can be continuously played in step 132 includes the following steps.

Step 1325: Determine, according to the media information of each TCP packet, a correspondence between a byte quantity and a media play period of time of the TCP packet.

Step 1326: Determine, according to the sequence number of the TCP packet received by the UE, a byte quantity of the TCP packet received by the UE.

Step 1327: Determine, according to the correspondence between the byte quantity and the media play period of time of the TCP packet and the byte quantity of the TCP packet received by the UE, media information of the TCP packet received by the UE.

The media information of each TCP packet may include only DTS information and frame byte quantity information. Accordingly, the application layer device may establish a correspondence between a DTS and a frame byte quantity of a TCP packet. Table 4 exemplarily shows a correspondence, between a DTS and a frame byte quantity of a TCP packet, corresponding to that in Table 1. It is assumed that the byte quantity of the TCP packet received by the UE is $(X_4+X_5+X_6+X_7)$, and then the application layer device may determine that the media period of time during which the data received by the UE is $(D_8-D_4)$. However, this embodiment of the present disclosure is not limited thereto.

TABLE 4

Example of a correspondence between a frame byte quantity and a DTS of a TCP packet

| | Frame byte quantity | | | | | | | |
| --- | --- | --- | --- | --- | --- | --- | --- | --- |
| | $X_1$ | $X_2$ | $X_3$ | $X_4$ | $X_5$ | $X_6$ | $X_7$ | $X_8$ |
| DTS | $D_1$ | $D_2$ | $D_3$ | $D_4$ | $D_5$ | $D_6$ | $D_7$ | $D_8$ |

Optionally, in another embodiment, the application layer device may further determine a media play period of time of each TCP packet according to the DTS information of each TCP packet, and establishes a correspondence between the media play period of time and a frame byte quantity of the TCP packet. Accordingly, the application layer device may determine, according to the foregoing established correspondence, a media play period of time corresponding to the byte quantity of the data received by the UE, and determine, according to the media play period of time, the media period of time during which the data received by the UE can be continuously played. However, this embodiment of the present disclosure is not limited thereto.

Optionally, in another embodiment, the media information of each TCP packet may also include DTS information, frame byte quantity information, media type information, and frame integrity information. Accordingly, the application layer device may establish a correspondence shown in Table 5. When determining the media period of time during which the data included in the TCP packet received by the UE can be continuously played, the application layer device may consider only an integrated video frame, and does not consider an audio frame and a non-integrated frame. In this way, the media period of time during which the TCP packet received by the UE can be continuously played and that is determined by the application layer device has higher precision, which can further improve user experience and enhance system performance. It is assumed that the byte quantity of the data received by the UE is $(X_4+X_5+X_6+X_7)$. Because frames corresponding to $X_6$ and $X_7$ are respectively an audio frame and a non-integrated video frame, the application layer device may exclude the audio frame and the non-integrated video frame, calculate a media period of time during which data of a quantity of the other bytes can be continuously played, and finally learn that the media period of time during which the data received by the UE can be continuously played is $(D_5-D_3)$. However, this embodiment of the present disclosure is not limited thereto.

TABLE 5

Media information of a TCP packet

| Frame byte quantity | DTS | Media type | Frame integrity |
|---|---|---|---|
| $X_1$ | $D_1$ | Video | Yes |
| $X_2$ | $P_1$ | Audio | Yes |
| $X_3$ | $D_2$ | Video | Yes |
| $X_4$ | $D_3$ | Video | Yes |
| $X_5$ | $D_4$ | Video | Yes |
| $X_6$ | $P_2$ | Audio | Yes |
| $X_7$ | $D_5$ | Video | No |
| $X_8$ | $D_6$ | Video | Yes |

Therefore, according to the method for determining a buffer status of UE in this embodiment of the present disclosure, media information of each TCP packet sent to the UE is determined, a TCP packet received by the UE is determined according to an acknowledgment packet sent by the UE, and a media period of time during which data received by the UE can be continuously played can be determined, and then a buffer status of the UE can be determined, which improves user experience and enhances system performance.

It should be understood that sequence numbers of the foregoing processes do not mean execution sequences. The execution sequences of the processes should be determined according to functions and internal logic of the processes, and should not be construed as any limitation on the implementation processes of the embodiments of the present disclosure.

Figure 3:
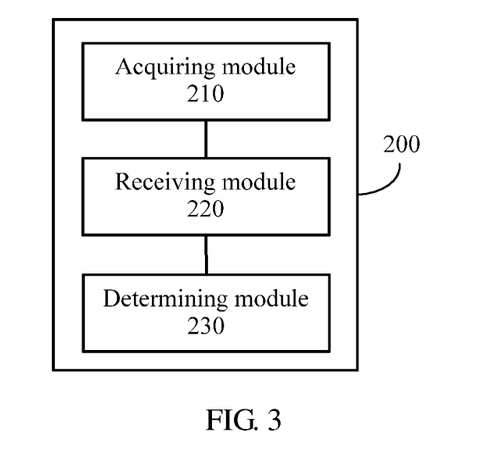
FIG. 3 is a schematic block diagram of an apparatus for determining a buffer status of UE according to an embodiment of the present disclosure.
Figure 4:
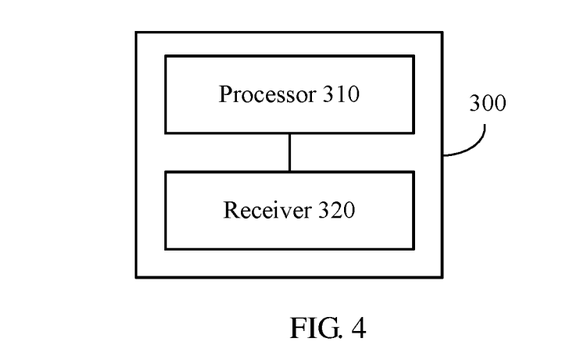
FIG. 4 is a schematic block diagram of an apparatus for determining a buffer status of UE according to another embodiment of the present disclosure.

With reference to FIG. 1 and FIG. 2, the foregoing describes in detail a method for determining a buffer status of UE according to an embodiment of the present disclosure. With reference to FIG. 3 and FIG. 4, the following describes in detail an apparatus for determining a buffer status of UE according to an embodiment of the present disclosure.

FIG. 3 shows a schematic block diagram of an apparatus 200 for determining a buffer status of UE according to an embodiment of the present disclosure. The apparatus 200 may be an application layer device. As shown in FIG. 3, the apparatus 200 includes an acquiring module 210 configured to acquire media information of each TCP packet sent to UE, a receiving module 220 configured to receive an acknowledgment packet sent by the UE, and a determining module 230 configured to determine, according to the acknowledgment packet received by the receiving module 220 and the media information that is of each TCP packet and is acquired by the acquiring module 210, a media period of time during which data received by the UE can be continuously played.

Therefore, according to the apparatus for determining a buffer status of UE in this embodiment of the present disclosure, media information of each TCP packet sent to the UE is determined, a TCP packet received by the UE is determined according to an acknowledgment packet sent by the UE, and a media period of time during which data received by the UE can be continuously played can be determined, and then a buffer status of the UE can be determined, which improves user experience and enhances system performance.

Optionally, the media information includes DTS information.

Optionally, in another embodiment, the media information further includes at least one media type information, frame byte quantity information, and frame integrity information.

Optionally, in another embodiment, the determining module 230 includes a first determining unit configured to determine, according to the acknowledgment packet and the media information of each TCP packet, media information of a TCP packet received by the UE, and a second determining unit configured to determine, according to the media information that is determined by the first determining unit and is of the TCP packet received by the UE, the media period of time during which the data received by the UE can be continuously played. Further, the second determining unit may determine, according to the media information of the TCP packet received by the UE, the media period of time during which the data received by the UE can be continuously played, or may determine, according to the media information of the TCP packet received by the UE and media information of a next TCP packet of a TCP packet that is lastly received by the UE, the media period of time during which the data received by the UE can be continuously played. However, this embodiment of the present disclosure is not limited thereto.

Optionally, in another embodiment, the determining module 230 includes a first determining unit configured to determine, according to the acknowledgment packet, a sequence number of a TCP packet received by the UE, and a second determining unit configured to determine, according to the sequence number that is of the TCP packet received by the UE and is determined by the first determining unit and the media information that is of each TCP packet and is acquired by the acquiring module 210, the media period of time during which the data received by the UE can be continuously played.

Optionally, in another embodiment, the second determining unit includes a first determining subunit configured to determine, according to the media information that is of each TCP packet and is acquired by the acquiring module 210, a correspondence between a sequence number and a DTS of the TCP packet, and a second determining subunit configured to determine, according to the correspondence between the sequence number and the DTS of the TCP packet and is determined by the first determining subunit and the sequence number that is of the TCP packet received by the UE and is determined by the first determining unit, the media period of time during which the data received by the UE can be continuously played.

The first determining subunit may determine a correspondence between a sequence number and media information of a TCP packet. Accordingly, the second determining subunit may determine, according to the sequence number of the TCP packet received by the UE and a correspondence between the sequence number and the media information of each TCP packet, the media period of time during which the data received by the UE can be continuously played. The media information may include only DTS information, and may further include at least one type of media type information, frame integrity information, and frame byte quantity information. However, this embodiment of the present disclosure is not limited thereto.

Optionally, in another embodiment, the second determining unit includes a third determining subunit configured to determine, according to the media information that is of each TCP packet and is acquired by the acquiring module 210, a correspondence between a sequence number and a media play period of time of the TCP packet, and a fourth determining subunit configured to determine, according to the correspondence between the sequence number and the media play period of time of the TCP packet and is determined by the third determining subunit and the sequence number that is of the TCP packet received by the UE and is determined by the first determining unit, the media period of time during which the data received by the UE can be continuously played.

The third determining subunit may also determine a correspondence between a sequence number of a TCP packet and a media play period of time and other media information of the TCP packet. The fourth determining subunit may determine, according to the sequence number of the TCP packet received by the UE and a correspondence between the sequence number of each TCP packet and the media play period of time and other media information of each TCP packet, the media period of time during which the data received by the UE can be continuously played. The other media information may include at least one type of media type information, frame integrity information, and frame byte quantity information. However, this embodiment of the present disclosure is not limited thereto.

Optionally, in another embodiment, the second determining unit includes a fifth determining subunit configured to determine, according to the media information that is of each TCP packet and is acquired by the acquiring module 210, a correspondence between a byte quantity and a media play period of time of the TCP packet, a sixth determining subunit configured to determine, according to the sequence number that is of the TCP packet received by the UE and is determined by the first determining unit, a byte quantity of the TCP packet received by the UE, and a seventh determining subunit configured to determine, according to the correspondence between the byte quantity and the media play period of time of the TCP packet and is determined by the fifth determining subunit and the byte quantity that is of the TCP packet received by the UE and is determined by the sixth determining subunit, media information of the TCP packet received by the UE.

Furthermore, the fifth determining subunit may establish a correspondence between a byte quantity and a DTS of a TCP packet. Accordingly, the seventh determining subunit may determine, according to the byte quantity of data included in the TCP packet received by the UE and a correspondence between a DTS and the frame byte quantity of the TCP packet, the media information of the TCP packet received by the UE. Alternatively, the fifth determining subunit may determine a correspondence between a byte quantity of a TCP packet and a DTS, a media play period of time, a media type, and frame integrity of the TCP packet. Accordingly, the seventh determining subunit may determine, according to the byte quantity of the data included in the TCP packet received by the UE and the foregoing correspondence, the media period of time during which the data received by the UE can be continuously played. However, this embodiment of the present disclosure is not limited thereto.

The apparatus 200 for determining a buffer status of UE according to this embodiment of the present disclosure may correspond to an execution body of the method for determining a buffer status of UE according to an embodiment of the present disclosure, such as an application layer device, and the foregoing and other operations and/or functions of modules in the apparatus 200 for determining a buffer status of UE are separately used to implement corresponding processes of methods in FIG. 1 and FIG. 2. For brevity, details are not described herein again.

Therefore, according to the apparatus for determining a buffer status of UE in this embodiment of the present disclosure, media information of each TCP packet sent to the UE is determined, a TCP packet received by the UE is determined according to an acknowledgment packet sent by the UE, and a media period of time during which data received by the UE can be continuously played can be determined, and then a buffer status of the UE can be determined, which improves user experience and enhances system performance.

FIG. 4 shows a schematic block diagram of an apparatus 300 for determining a buffer status of UE according to another embodiment of the present disclosure. The apparatus 300 may be an application layer device. As shown in FIG. 4, the apparatus 300 includes a processor 310 and a receiver 320, where the processor 310 is configured to acquire media information of each TCP packet sent to UE, the receiver 320 is configured to receive an acknowledgment packet sent by the UE, and the processor 310 is further configured to determine, according to the acknowledgment packet received by the receiver 320 and the media information of each TCP packet, a media period of time during which data received by the UE can be continuously played.

Therefore, according to the apparatus 300 for determining a buffer status of UE in this embodiment of the present disclosure, media information of each TCP packet sent to UE is determined, a TCP packet received by the UE is determined according to an acknowledgment packet sent by the UE, and a media period of time during which data received by the UE can be continuously played can be determined, and then a buffer status of the UE can be determined, which improves user experience and enhances system performance.

It should be understood that in this embodiment of the present disclosure, the processor 310 may be a central processing unit (CPU), or the processor 310 may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor, or the processor may be any conventional processor, or the like.

Optionally, the apparatus 300 may further include a memory and a bus system. The memory is used to store an instruction. The processor 310 invokes the instruction stored in the memory using the bus system. The memory may include a read-only memory and a random access memory, and provides an instruction and data to the processor 310. A part of the memory may further include a non-volatile random access memory. For example, the memory may further store device type information.

The bus system may include a power bus, a control bus, a status signal bus, and the like in addition to a data bus. However, for clear description, various types of buses are marked as the bus system in the figure.

In an implementation process, the steps in the foregoing methods may be completed by means of an integrated logic circuit of hardware in the processor 310 or an instruction in a form of software. Steps of the methods disclosed with reference to the embodiments of the present disclosure may be directly executed and completed by means of a hardware processor, or may be executed and completed using a combination of hardware and software modules in the processor 310. The software module may be located in a mature storage medium in the field, such as a random access memory, a flash memory, a read-only memory, a programmable read-only memory, an electrically-erasable programmable memory, or a register. The storage medium is located in the memory, and the processor 310 reads information in the memory and completes the steps in the foregoing methods in combination with hardware of the processor 310. To avoid repetition, details are not described herein again.

Optionally, the media information includes DTS information.

Optionally, in another embodiment, the media information further includes at least one media type information, frame byte quantity information, and frame integrity information.

Optionally, in another embodiment, the processor 310 is further configured to determine, according to the acknowledgment packet and the media information of each TCP packet, media information of a TCP packet received by the UE, and determine, according to the media information of the TCP packet received by the UE, the media period of time during which the data received by the UE can be continuously played. Furthermore, the processor 310 may determine, according to the media information of the TCP packet received by the UE, the media period of time during which the data received by the UE can be continuously played, or may determine, according to the media information of the TCP packet received by the UE and media information of a next TCP packet of a TCP packet that is lastly received by the UE, the media period of time during which the data received by the UE can be continuously played. However, this embodiment of the present disclosure is not limited thereto.

Optionally, in another embodiment, the processor 310 is further configured to determine, according to the acknowledgment packet, a sequence number of a TCP packet received by the UE, and determine, according to the sequence number of the TCP packet received by the UE and the media information of each TCP packet, the media period of time during which the data received by the UE can be continuously played.

The processor 310 is further configured to determine, according to the media information of each TCP packet, a correspondence between a sequence number and a DTS of the TCP packet, and determine, according to the correspondence between the sequence number and the DTS of the TCP packet and the sequence number of the TCP packet received by the UE, the media period of time during which the data received by the UE can be continuously played.

The processor 310 may determine a correspondence between a sequence number and media information of a TCP packet. Accordingly, the processor 310 may determine, according to the sequence number of the TCP packet received by the UE and a correspondence between the sequence number and the media information of each TCP packet, the media period of time during which the data received by the UE can be continuously played. The media information may include only DTS information, and may further include at least one type of media type information, frame integrity information, and frame byte quantity information. However, this embodiment of the present disclosure is not limited thereto.

Optionally, in another embodiment, the processor 310 is further configured to determine, according to the media information of each TCP packet, a correspondence between a sequence number and a media play period of time of the TCP packet, and determine, according to the correspondence between the sequence number and the media play period of time of the TCP packet and the sequence number of the TCP packet received by the UE, the media period of time during which the data received by the UE can be continuously played.

The processor 310 may also determine a correspondence between a sequence number of a TCP packet and a media play period of time and other media information of the TCP packet, and determine, according to the sequence number of the TCP packet received by the UE and a correspondence between the sequence number of each TCP packet and the media play period of time and other media information of each TCP packet, the media period of time during which the data received by the UE can be continuously played. The other media information may include at least one type of media type information, frame integrity information, and frame byte quantity information. However, this embodiment of the present disclosure is not limited thereto.

Optionally, in another embodiment, the processor 310 is further configured to determine, according to the media information of each TCP packet, a correspondence between a byte quantity and a media play period of time of the TCP packet, determine, according to the sequence number of the TCP packet received by the UE, a byte quantity of the TCP packet received by the UE, and determine, according to the correspondence between the byte quantity and the media play period of time of the TCP packet and the byte quantity of the TCP packet received by the UE, media information of the TCP packet received by the UE.

Furthermore, the processor 310 may establish a correspondence between a byte quantity and a DTS of a TCP packet, and determine, according to the byte quantity of data included in the TCP packet received by the UE and a correspondence between a DTS and the frame byte quantity of the TCP packet, the media information of the TCP packet received by the UE. Alternatively, the processor 310 may determine a correspondence between a byte quantity of a TCP packet and a DTS, a media play period of time, a media type, and frame integrity of the TCP packet, and determine, according to the byte quantity of the data included in the TCP packet received by the UE and the foregoing correspondence, the media period of time during which the data received by the UE can be continuously played. However, this embodiment of the present disclosure is not limited thereto.

The apparatus 300 for determining a buffer status of UE according to this embodiment of the present disclosure may correspond to an execution body of the method for determining a buffer status of UE according to an embodiment of the present disclosure, such as an application layer device, and the foregoing and other operations and/or functions of modules in the apparatus 300 for determining a buffer status of UE are respectively used to implement corresponding processes of methods in FIG. 1 and FIG. 2. For brevity, details are not described herein again.

Therefore, according to the apparatus 300 for determining a buffer status of UE in this embodiment of the present disclosure, media information of each TCP packet sent to the UE is determined, a TCP packet received by the UE is determined according to an acknowledgment packet sent by the UE, and a media period of time during which data received by the UE can be continuously played can be determined, and then a buffer status of the UE can be determined, which improves user experience and enhances system performance.

It should be understood that, the term "and/or" in this embodiment of the present disclosure describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method comprising:
    acquiring media information of each transmission control protocol (TCP) packet sent to a user equipment (UE);
    receiving an acknowledgment packet from the UE;
    determining, according to the acknowledgment packet and the media information of each TCP packet, a media period of time during which data sent to the UE will be continuously played; and
    setting a buffer size according to the media period of time during which data sent to the UE will be continuously played.

2. The method of claim 1, wherein determining, according to the acknowledgment packet and the media information of each TCP packet, the media period of time during which data sent to the UE will be continuously played comprises:
    determining, according to the acknowledgment packet, a sequence number of a TCP packet sent to the UE; and
    determining, according to the sequence number of the TCP packet send to the UE and the media information of each TCP packet, the media period of time during which the data sent to the UE will be continuously played.

3. The method of claim 2, wherein the media information comprises a decoding time stamp (DTS), and determining, according to the sequence number of the TCP packet sent to the UE and the media information of each TCP packet, the media period of time during which the data sent to the UE will be continuously played comprises:
    determining, according to the media information of each TCP packet, a correspondence between the sequence number and a DTS of the TCP packet; and
    determining, according to the correspondence between the sequence number and the DTS of the TCP packet and the sequence number of the TCP packet sent to the UE, the media period of time during which the data sent to the UE will be continuously played.

4. The method of claim 2, wherein determining, according to the sequence number of the TCP packet sent to the UE and the media information of each TCP packet, the media period of time during which the data sent to the UE will be continuously played comprises:
    determining, according to the media information of each TCP packet, a correspondence between the sequence number and a media play period of time of the TCP packet; and
    determining, according to the correspondence between the sequence number and the media play period of time of the TCP packet and the sequence number of the TCP packet sent to the UE, the media period of time during which the data sent to the UE will be continuously played.

5. The method of claim 2, wherein determining, according to the sequence number of the TCP packet sent to the UE and the media information of each TCP packet, the media period of time during which the data sent to the UE will be continuously played comprises:

determining, according to the media information of each TCP packet, a correspondence between a byte quantity and a media play period of time of the TCP packet;

determining, according to the sequence number of the TCP packet sent to the UE, the byte quantity of the TCP packet sent to the UE; and determining, according to the correspondence between the byte quantity and the media play period of time of the TCP packet and the byte quantity of the TCP packet sent to the UE, media information of the TCP packet sent to the UE.

6. The method of claim 1, wherein the media information comprises a decoding time stamp (DTS).

7. The method of claim 1, wherein the media information comprises media type information.

8. The method of claim 1, wherein the media information comprises frame byte quantity information.

9. The method of claim 1, wherein the media information comprises frame integrity information.

10. The method of claim 1, wherein the buffer size balances a delay for the data and a packet loss rate for the data.

11. An apparatus comprising:
a processor configured to acquire media information of each transmission control protocol (TCP) packet sent to a user equipment (UE); and
a receiver coupled to the processor and configured to receive an acknowledgment packet from the UE,
the processor being further configured to:
determine, according to the acknowledgment packet and the media information that is of each TCP packet, a media period of time during which data sent to the UE will be continuously played; and
set a buffer size according to the media period of time during which data sent to the UE will be continuously played.

12. The apparatus of claim 11, wherein the processor is further configured to:
determine, according to the acknowledgment packet, a sequence number of a TCP packet sent to the UE; and
determine, according to the sequence number that is of the TCP packet sent to the UE and the media information that is of each TCP packet, the media period of time during which the data sent to the UE will be continuously played.

13. The apparatus of claim 12, wherein the media information comprises a decoding time stamp (DTS), and the processor is further configured to:

determine, according to the media information that is of each TCP packet, a correspondence between the sequence number and a DTS of the TCP packet; and determine, according to the correspondence between the sequence number and the DTS of the TCP packet and the sequence number that is of the TCP packet sent to the UE, the media period of time during which the data sent to the UE will be continuously played.

14. The apparatus of claim 12, wherein the processor is further configured to:
determine, according to the media information that is of each TCP packet, a correspondence between the sequence number and a media play period of time of the TCP packet; and determine, according to the correspondence between the sequence number and the media play period of time of the TCP packet and the sequence number that is of the TCP packet sent to the UE, the media period of time during which the data sent to the UE will be continuously played.

15. The apparatus of claim 12, wherein processor is further configured to:
determine, according to the media information that is of each TCP packet, a correspondence between a byte quantity and a media play period of time of the TCP packet;

determine, according to the sequence number that is of the TCP packet sent to the UE, the byte quantity of the TCP packet sent to the UE; and determine, according to the correspondence between the byte quantity and the media play period of time of the TCP packet and the byte quantity that is of the TCP packet sent to the UE, media information of the TCP packet sent to the UE.

16. The apparatus of claim 11, wherein the media information comprises a decoding time stamp (DTS).

17. The apparatus of claim 11, wherein the media information comprises media type information.

18. The apparatus of claim 11, wherein the media information comprises frame byte quantity information.

19. The apparatus of claim 11, wherein the media information comprises frame integrity information.

20. The apparatus of claim 11, wherein the buffer size balances a delay for the data and a packet loss rate for the data.

* * * * *

UNITED STATES PATENT AND TRADEMARK OFFICE
CERTIFICATE OF CORRECTION

PATENT NO. : 10,142,249 B2
APPLICATION NO. : 15/175827
DATED : November 27, 2018
INVENTOR(S) : Bing Chen Page 1 of 1

It is certified that error appears in the above-identified patent and that said Letters Patent is hereby corrected as shown below:

On the Title Page

Item (30), Line 1: "201310664193" should read "201310664193.6"

In the Claims

Column 18, Line 30: "TCP packet send" should read "TCP packet sent"

Signed and Sealed this
Twenty-ninth Day of January, 2019

Andrei Iancu
*Director of the United States Patent and Trademark Office*